No. 860,275. PATENTED JULY 16, 1907.
J. C. BARBER.
ANTIFRICTION CENTER BEARING FOR CARS.
APPLICATION FILED NOV. 19, 1906.

Witnesses:
H. S. Kilgore
A. H. Opsahl

Inventor:
John C. Barber,
By his Attorneys,
Williamson & Merchant

UNITED STATES PATENT OFFICE.

JOHN C. BARBER, OF CHICAGO, ILLINOIS.

ANTIFRICTION CENTER-BEARING FOR CARS.

No. 860,275.　　　　Specification of Letters Patent.　　　Patented July 16, 1907.

Application filed November 19, 1906. Serial No. 343,976.

*To all whom it may concern:*

Be it known that I, JOHN C. BARBER, a citizen of the United States, residing at Chicago, in the county of Cook and State of Illinois, have invented certain new and useful Improvements in Antifriction Center-Bearings for Cars; and I do hereby declare the following to be a full, clear, and exact description of the invention, such as will enable others skilled in the art to which it appertains to make and use the same.
This invention relates to anti-friction center bearings for railway cars and the like, and has for its object to improve the same in the several particulars hereinafter noted.

The invention consists of the novel devices and combinations of devices hereinafter described and defined in the claims.

Figure 1:
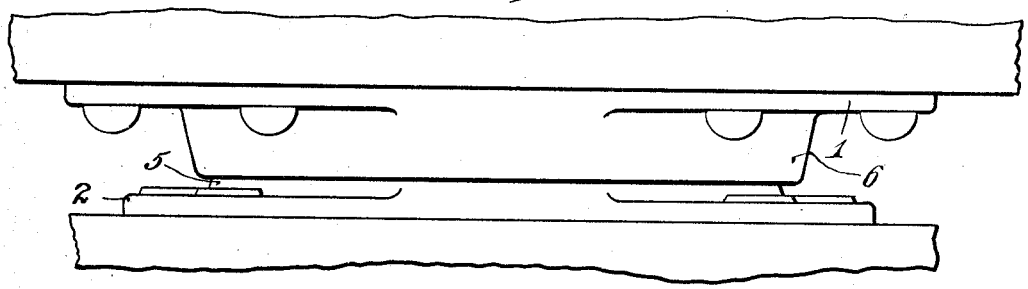
Figure 2:
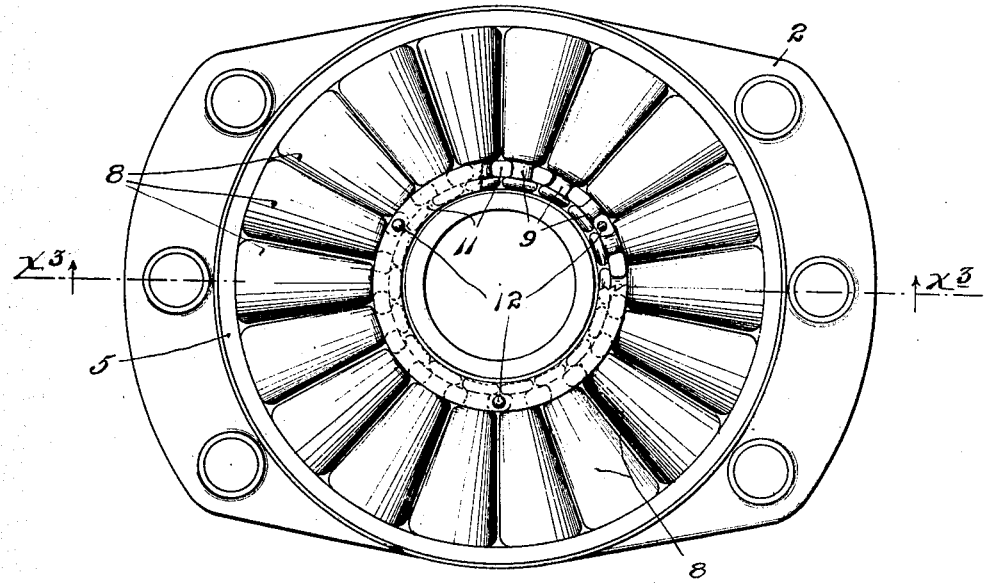
Figure 3:
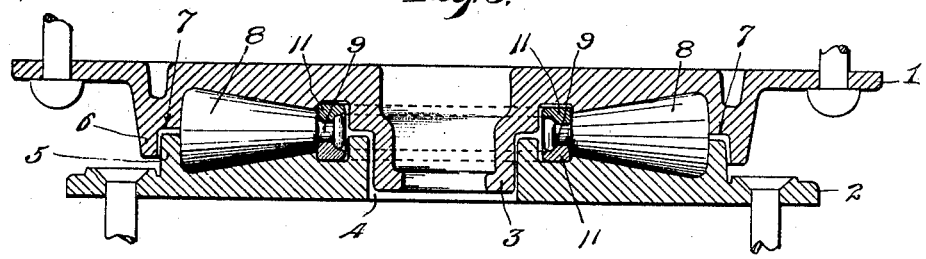
Figure 4:
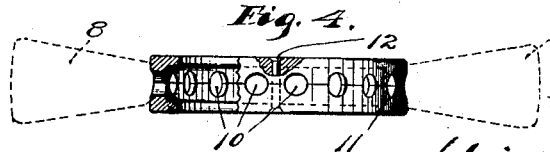

In the accompanying drawings which illustrate the invention, like characters indicate like parts throughout the several views.
Referring to the drawings, Figure 1 is a view in elevation, with parts broken away, showing the improved center bearing. Fig. 2 is a plan view of the center bearing, with the upper bearing member removed. Fig. 3 is a transverse vertical section taken through the center bearing on the line $x^3$ $x^3$ of Fig. 2; and Fig. 4 is a detail in end elevation, with some parts broken, showing the interlocking roller retaining ring, two of the rollers being indicated by dotted lines.

The upper member 1 of the center bearing is adapted to be directly secured to the body bolster (not shown) of a car, and it is preferably in the form of a steel or malleable casting. The lower bearing member 2 of the center bearing is also preferably in the form of a steel or malleable casting, and it is adapted to be directly secured to a truck bolster (not shown); also, when the center bearing is incorporated in a lateral motion center bearing such as that disclosed in my prior patent No. 588,810, issued of date August 12, 1897, the said bearing member 2 may constitute the combined lower bearing member of the center bearing proper, and the upper bearing member of the lateral motion device. At its central portion, the upper bearing member 1 is provided with a depending hub 3 that works in a central seat 4 of the lower bearing member 2. At its outer portion, the lower bearing member 2 is shown as provided with an upwardly extended annular flange 5, and just outward of this flange 5 the upper bearing member 1 is provided with a depending annular flange 6, which latter flange surrounds the former and, hence, serves as a dust guard. The depend-
ing annular flange 6 is shown as formed, above the flange 5, with an inwardly offset shoulder portion 7.

Inward of their flanged portions 7 and 5, the bearing members 1 and 2, respectively, are formed with inwardly converging conical bearing surfaces between which are interposed a series of closely positioned radially disposed conical bearing rollers 8. The outer ends of the rollers 8 are rounded on the arc of a circle struck from the axis of the center bearing, and they engage and thrust against said flanged portions 5 and 7.

At their rear ends, the bearing rollers 8 are formed with heavy headed trunnions 9 that are preferably formed integral therewith. These headed trunnions are journaled or swiveled in seats 10 formed in a divided two-part retaining ring 11. The sections of this retaining ring are secured together by any suitable means, but preferably by rivets 12. The upper and lower bearing members 1 and 2 are formed with annular clearance grooves that together form a seat in which the said retaining ring is adapted to rotate or oscillate without frictional contact with the said bearing members. This retaining ring also serves to space the rollers, but when the rollers are closely positioned, as shown in the drawings, this function becomes secondary to the main function which consists in maintaining the rollers interlocked and in their proper relative positions when the center bearing members are separated, and even when the rollers are entirely removed from the center bearing. The said rollers may, therefore, be said to be rotatively interlocked to the said retaining ring and this, it will be noted, is accomplished by direct engagement between the headed trunnions thereof and the said ring. The seats 10 for the said headed trunnions, it will be noted, are formed one half in each of the sections of the retaining ring, so that the rollers may be readily removed from said ring or applied thereto when the sections of the retaining ring are separated. This feature, also, of course, greatly facilitates the assembling of the rollers and the retaining ring.

The device described, while of small cost, is highly efficient for the purposes had in view, and makes possible the use of a maximum number of bearing rollers in any particular center bearing.

What I claim is:

1. In a center bearing, the combination with upper and lower bearing members, of rollers interposed between said bearings, said rollers having headed trunnions at one end, and a split or two part retaining ring having supplemental seats formed in part in each of the ring sections, each of which seats receives and interlocks with one of the said headed trunnions but permits rotary movement of said rollers, substantially as described.

2. In a center bearing, the combination with upper and lower bearing members, of conical rollers interposed between said bearing members and provided at their inner ends with headed trunnions, the outer ends of said rollers being rounded and at least one of said bearing members having an annular shoulder that engages the said rounded outer ends of said rollers, and a two part retaining ring, the sections of which join approximately in a plane intersecting the axis of the bearing at a right angle, and which ring sections have supplemental seats each of which receives and interlocks with one of the said headed trunnions, but which seats permit the said rollers to rotate, substantially as described.

In testimony whereof I affix my signature in presence of two witnesses.

JOHN C. BARBER.

Witnesses:
A. M. LOVE,
LEE W. BARBER.